United States Patent [19]
Covington et al.

[11] Patent Number: 5,081,828
[45] Date of Patent: Jan. 21, 1992

[54] METHOD OF ACCESSING ADJACENT HARVESTING UNITS OF A COTTON HARVESTER

[75] Inventors: Michael J. Covington, LaGrange; Jesse H. Orsborn, Hinsdale, both of Ill.

[73] Assignee: J. I. Case Company, Racine, Wis.

[21] Appl. No.: 621,315

[22] Filed: Dec. 3, 1990

Related U.S. Application Data

[63] Continuation-in-part of Ser. No. 436,304, Nov. 13, 1989.

[51] Int. Cl.$^5$ .............................................. A01D 46/08
[52] U.S. Cl. .......................................... 56/28; 56/13.5; 56/15.5
[58] Field of Search ................... 56/28, 13.2, 15.9, 40, 56/41, 44, 15.5, 13.5

[56] References Cited

U.S. PATENT DOCUMENTS

| | | | |
|---|---|---|---|
| Re. 32,699 | 6/1988 | Fachini | 56/44 |
| 4,344,271 | 8/1982 | Schlueter et al. | 56/13.6 |
| 4,803,830 | 2/1989 | Junge et al. | 56/28 |
| 4,875,330 | 10/1989 | Deutsch et al. | 56/28 |

*Primary Examiner*—Stephen J. Novosad
*Attorney, Agent, or Firm*—Goldsmith, Shore, Sutker & Milnamow, Ltd. Dressler

[57] ABSTRACT

A system for mounting and supporting harvesting units on a forward end of a cotton harvester frame to allow them to be slidably moved relative to each other and laterally along an elongated tool bar structure. The tool bar structure is pivotally connected to the cotton harvester frame by a lift assembly. The harvesting units are independently connected at their rearward edges to the tool bar structure by a slide support structure. The slide support structure maintains a non-rotatable and non-point contact relationship with laterally elongated generally flat support surfaces defined between opposite ends of the tool bar structure whereby subsantial surface area contact is provided between each side support structure and the support surfaces on the tool bar structure. To facilitate numerous combinations of row spacings and harvesting capacities, the tool bar structure is preferably comprised of modular units which are connected together in axially aligned relation and includes a pivotal extension provided at either or both ends of the tool bar structure. When axially aligned with the tool bar structure, the pivotal extension provides coextensive elongation of the support surfaces on the tool bar structure. An operator-controlled driver mechanism is preferably provided to facilitate precise positioning of the harvesting units relative to each other and along the support surfaces of the tool bar structure. The present invention further relates to a method of accessing at least three adjacent harvesting units of a cotton harvester while maintaining a minimal length for tool bar assembly on which the harvesting units are slidably mounted.

4 Claims, 6 Drawing Sheets

FIG_2

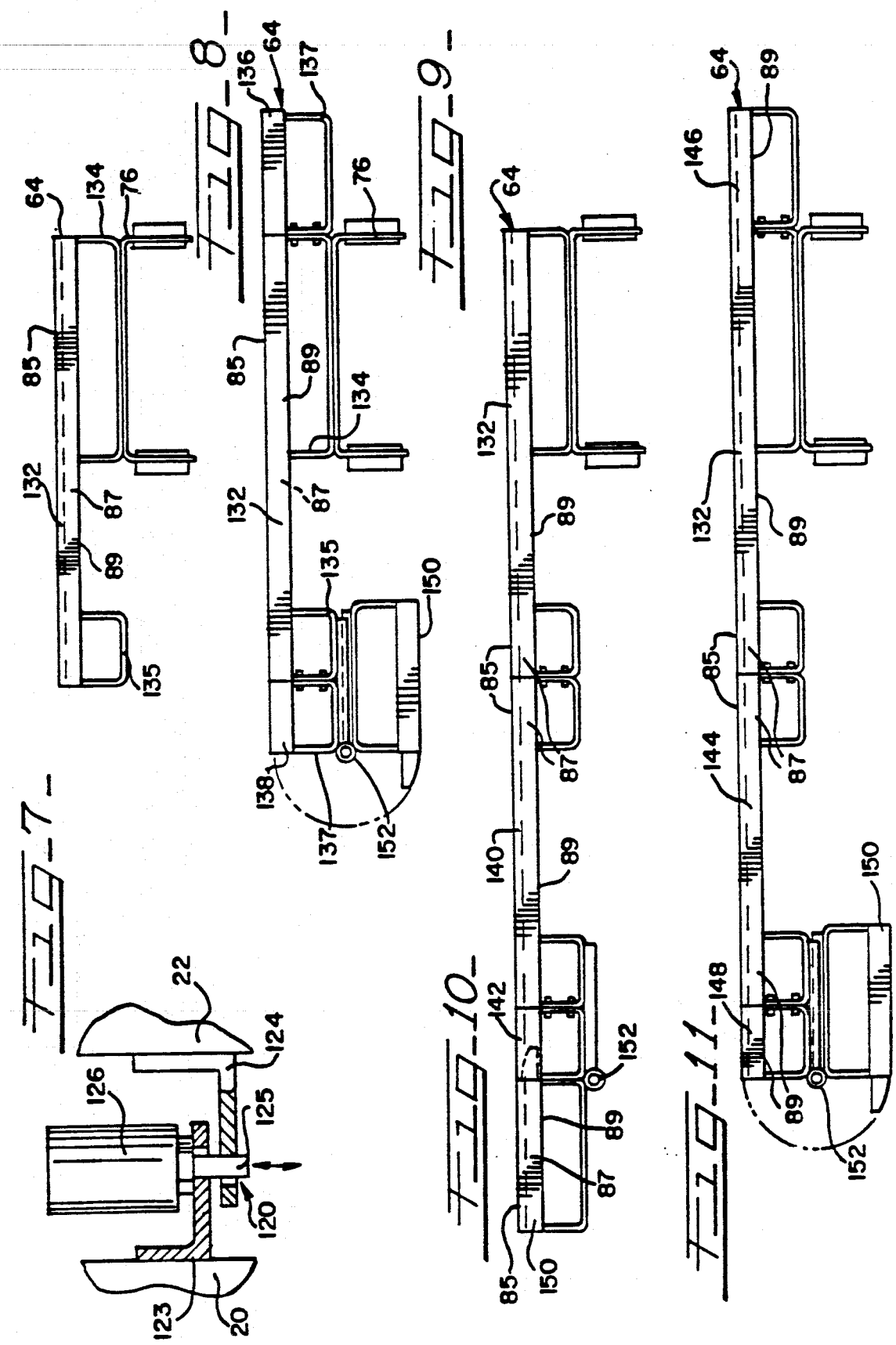

METHOD OF ACCESSING ADJACENT HARVESTING UNITS OF A COTTON HARVESTER

RELATED APPLICATIONS

This application is a Continuation-In-Part of pending application Ser. No. 07/436,304 filed Nov. 13, 1989.

FIELD OF THE INVENTION

This invention generally relates to a cotton harvester and, more particularly, to a system for individually mounting and supporting at least two harvesting units on a frame of a cotton harvester for lateral displacement relative to each other.

BACKGROUND OF THE INVENTION

For many years, rows of cotton were spaced at least 38 to 40 inches apart. Recently, however, farmers have noted a substantial increase in productivity when row width is narrowed; i.e., spacing between cotton rows being about 30 inches. Besides an increase in cotton productivity, narrow row widths allow for uniformity between seed planting operations. For these and other reasons, there is an incentive to plant cotton in narrow rows.

Conventional self-propelled cotton harvesters utilize individual harvesting units mounted at a forward end of the harvester. Cotton harvesters having up to four individual harvesting units arranged in side-by-side relationship relative to each other have been designed to increase cotton picker production.

Each harvesting unit typically includes two picker rotors comprised of numerous circularly driven picker bars. Each picker bar mounts a plurality of rotatably driven, radially extending picker spindles for removing the cotton from the plant. A pair of doffer assemblies together with a picker spindle moistening assembly are typically provided in combination with each harvesting unit. Each doffer assembly, having numerous doffer pads, is provided to remove the cotton from the individual picker spindles. The picker spindle moistening assembly includes a series of vertically arranged moistening pads for adding moistening fluid to each of the cotton picker spindles before they are introduced to the cotton plant.

Typically, the harvesting units are connected to a support structure which extends laterally across a forward end of the cotton harvester. To adjust for row width, the harvesting units are moved laterally across the support structure. Although considerable design effort has resulted in cotton harvester units of reduced size and weight, the usage and required operation of such units mandate a relatively large size mechanism having considerable weight. Because of their size and weight, however, laterally moving the units to adjust row width is difficult and usually requires considerable efforts on the part of the operator. As a result, lateral adjustment of the harvesting units is inconvenient, difficult, and is usually avoided whenever possible.

The harvesting capacity of the cotton harvester varies as a function of the number of harvesting units associated therewith. As will be appreciated, a support structure for accommodating four side-by-side harvesting units which are arranged to harvest adjacent rows of cotton planted 40 inches apart must be substantially wider than the support structure used to accommodate two harvesting units arranged to harvest adjacent rows of cotton narrowly spaced approximately 30 inches apart.

Providing a single support structure for accommodating all the numerous combinations of row spacings and harvesting capacities is impractical because the distance between the ends of such support structure would be too wide for conveniently transporting the cotton harvester. In view of today's economics, a farmer wanting two or three narrow row capacity does not want the added cost, weight and inconvenience of a support structure which is wider than that which he requires.

Having separate one-piece support structures for adapting the cotton harvester to each of the required widths results in increased manufacturing costs, area distribution costs, and inhibits a farmer from subsequently increasing the capacity of his machine unless he buys a wider support structure. Moreover, wider support structures present problems in that they are difficult to ship from one location to another and are inconvenient to handle.

Another problem with cotton harvesters relates to inspection and servicing of the harvesting units. Although desirable, it is not practical to laterally move the harvesting units relative to each other along the support structure to provide added clearance for inspection and servicing of the harvesting units. As an example, to remove an inboard harvesting unit for servicing usually requires removal of the adjacent outboard harvesting unit. Simultaneous removal of both harvesting units causes problems due to the bulkiness and weight of the separate harvesting units. As will be appreciated, a support structure which is longer than required only adds to the burdensome problem of removing the harvesting units therefrom. Moreover, removal of the outboard harvesting unit before the removal of the inboard harvesting unit takes additional time, a premium during harvest season.

U.S. Pat. No. 4,803,830 to S. A. Junge et al. discloses a support arrangement for cotton harvester row units. The support arrangement includes a row unit support frame which is connected by a four-bar linkage structure to a main frame of the cotton harvester. The support frame includes longitudinally spaced, horizontal and laterally extending beams or rails which are interconnected by a cross beam. Notably, one rail is arranged immediately adjacent the center of gravity of the row units.

Each of the individual row units is suspended on the rails by a roller assembly including laterally spaced rollers which may include bearings to improve performance. The rollers maintain point contact with a surface forming a part of or connected to the laterally extending rails so that the row units can be moved laterally to effect the desired spacing between adjacent row units by rolling the row units on the surfaces defined by the lateral rails. Once the harvesting units are properly spaced, they are locked into position by pins.

The rail and roller structure disclosed in the Junge et al. patent contributes to easier movement of the row units and thereby enhances access to the row units for servicing and general maintenance. The substantial weight of each row unit, however, is localized at the point of contact established between each roller and the rail which supports that roller. It has been found that, over time, such point contact causes pitting of the surface over which the roller rides. As will be appreciated, pitting of the rail surface will inhibit smooth, lateral movement of the roller thereover and can cause difficulty in aligning the pins to lock the row units in position. It has also been found that the substantial weight of the row unit causes the rollers to lockup and/or reduce the life of the bearings. Roller lockup and/or bearing failure will only add to the farmer's frustration in effecting servicing of the harvesting units.

During a cotton harvesting operation, there is a significant amount of dirt, dust and trash entrapped in the environmental air surrounding the harvester. Some of such dirt, dust and trash settles on the rail and furthermore causes wear on the rollers and bushings or bearings normally provided therefore. As will be appreciated, roller wear or bearing failure will frustrate and interfere with smooth lateral movement of the harvesting units.

Although the above-described support structure enhances row spacing, the provision of a rail which laterally extends above and across the top of each row unit inhibits complete access to the row units. As is evident, the location of the extended rail above the center of gravity of the harvesting unit permits only limited access to the row units and daily service and inspection operations can not be made easily and conveniently. Moreover, the location of the rail above the center of the harvesting units hinders or interferes with operator visibility of the row units from the cab region of the harvester.

Accessing the row units is effected through independent lateral displacement of the individual row units along the length of the rail structure. To effect such ends, the overall length of the rail structure must be increased to accommodate lateral movements of the harvesting units to serviceable positions. As will be appreciated, increasing the length of the rail structure can be detrimental to harvester performance. More specifically, increasing the length of the rail structure to allow for individual access between the harvesting units may cause severe interference between the rail structure and adjacent rows of cotton plants during field operation. Such interference with the rail structure may cause damage to the cotton plants thus effecting the crop harvest. Moreover, increasing the length of the rail structure interferes with transportation of the harvester over narrow roads and when entering narrow field openings.

SUMMARY OF THE INVENTION

In view of the above, and in accordance with this invention, there is provided a system for mounting and supporting harvesting units on a forward end of a cotton harvester so as to allow the harvesting units to be slidably moved relative to each other laterally along an elongated tool bar structure to accommodate various combinations of row widths. In one position, the harvesting units are arranged relative to each other to facilitate picking of narrow rows of cotton. In the other position, the harvesting units are more widely spaced from one another to allow for either picking wider rows of cotton or to permit servicing of the individual harvesting units without requiring complete removal of the harvesting units from the cotton harvester. The tool bar structure is adaptable to easily and conveniently accommodate numerous combinations of crop row widths and harvesting row capacities.

More specifically, the cotton harvester of the present invention includes a frame which is supported by a pair of wheeled axles. At least two harvesting units are individually supported at a forward end of the frame in an adjacent or side-by-side relationship relative to each other. Each harvesting unit defines a fore-and-aft plant passage and includes first and second picker rotors.

To facilitate access therebetween, and to not hinder visibility of the harvesting units from the cab region of the harvester, the harvesting units are connected at their rearmost edges and hang in a cantilevered fashion from the tool bar structure. The tool bar structure is connected to the frame by a lift assembly which allows the tool bar structure and harvesting units to pivotally move about a laterally horizontal axis upon their vertical displacement relative to the frame of the harvester so as to maintain a substantially constant parallel orientation relative to the ground surface.

The tool bar structure is configured to define generally flat support surfaces which laterally extend across a forward end of the cotton harvester frame between first and second ends of the tool bar structure. At least one harvesting unit is slidably mounted on the tool bar structure. The slidably mounted harvesting unit is connected to the tool bar structure by a support structure which combines with the support surfaces on the tool bar structure to inhibit rotational movement of the harvesting unit about the longitudinal axis of the tool bar structure and allows the harvesting unit to slidably move along the support surfaces. The support structure has substantial surface area contact with the support surfaces on the tool bar structure to allow the substantial weight of the harvesting unit to be distributed over a broad contact area. Although a non-point contact relationship is established between the support structure and tool bar structure, the support structure for the slidable harvesting unit is movable between the ends of the tool bar structure to facilitate selective lateral shifting of the harvesting units relative to each other. The non-point contact sliding relationship between the support structure and the support surfaces of the tool bar structure furthermore provides a self-cleaning action as the harvesting unit slides along the support surfaces.

In a preferred form, the lift assembly comprises a four-bar linkage for connecting the tool bar structure to the frame. The lift assembly further includes a hydraulic driver whose operative length controls the angular displacement of the linkage and thereby the vertical disposition of the harvesting units relative to the frame of the machine.

The support structure which connects the slidable harvesting unit to the tool bar preferably includes a channel-shaped bracket which embraces the tool bar structure and an upstanding lever arm which extends upwardly from the bracket and rearwardly of the slidable harvesting unit. Because the slidable harvesting unit is connected at its rearmost edge to the tool bar structure, it normally has a tendency to rotate downwardly at its forward end. To inhibit the slidable harvesting unit from rotating downward, one end of an upper tension link is pivotally attached to a forward end of the harvesting unit and has its opposite end attached to an upper end of the lever arm. As the forward end of the harvesting unit tends to move downward under its own weight, the upper tension link goes into tension pulling on the lever arm of the support structure. This pull is transferred to the bracket which embraces the tool bar structure and is applied as a torque to the tool bar structure. The tool bar structure is configured to counteract this torque and holds the slidable harvesting unit upright.

Relatively low friction and durable surfaces are provided between each bracket and each of the support surfaces on the elongated tool bar structure. These low friction surfaces reduce the frictional sliding contact between the bracket and the support surfaces on the tool bar in a manner facilitating lateral sliding movement of the harvesting unit.

The mounting and supporting system of the present invention further includes a mechanism for effecting precise and positive positioning of the harvesting units along the length of the tool bar structure. In a preferred form, a pair of linearly distendable drivers is operably connected and extends substantially parallel to the tool bar structure. An operative end of each driver is operably connected to an outermost harvesting unit. Each driver can also be selectively connected to an inwardly adjacent harvesting unit. Thus, if it is desired to slidably move and positively position the end harvesting units along the length of the tool bar structure, the drivers are linearly extended to positively and laterally slide the outermost harvesting units relative to an adjacent unit a predetermined amount and, thereby, vary the lateral spacing therebetween. If it is desired to conjointly move the inner and outer harvesting units, both the inner and outer harvesting units are connected to the operative end of the driver to move them both laterally when the rod is extended.

The tool bar structure is preferably of modular construction. In the preferred embodiment, the tool bar structure is comprised of an elongated tubular support comprised of one or more aligned modular members or extensions which are bolted together to provide the tool bar structure with a desired length between its ends. The support surfaces defined by the elongated tubular support and the modular members are coextensive with each other to not interfere with sliding movement of the harvesting units therealong. The ability to add or subtract modular members makes it easy and convenient for a farmer to modify the length of the tool bar structure to accommodate numerous combinations of crop row spacings and harvesting row capacities.

The tool bar structure may further include an extension pivotally connected to one end thereof. The pivotal extension has generally flat support surfaces which are identical with those on the tool bar structure. When pivoted into axially aligned relation with the tool bar structure, the support surfaces on the extension are coextensive with the support surfaces on the tool bar structure. As such, the movable harvesting units may be readily and laterally moved onto the pivotal extension for servicing or for harvesting a row of cotton normally spaced outside the width of the tool bar structure. During transport or when a harvesting unit is not supported thereon, the pivotal extension may be arranged behind the tool bar structure to diminish the length of the tool bar structure to not interfere with the cotton plants or harvesting operation.

Another salient feature of the present invention is the provision of two tool bar structures which are vertically movable independent of each other and are arranged in side-by-side relation at the forward end of the frame. The provision of two relatively movable tool bar structures readily lends itself to mounting three or more harvesting units at the forward end of the harvester. In a three-row arrangement, two harvesting units are typically arranged on one tool bar structure while the remaining harvesting unit is mounted on the other tool bar structure. The ability of the present invention to provide independent mounting arrangements for the harvesting units facilitates vertical positioning of the harvesting units relative to various ground contours over which the harvester moves during a harvesting operation.

A mounting and supporting system according to the present invention facilitates lateral adjustment of the harvesting units to accommodate different row spacings and enhances an operator's ability to inspect and service the harvesting units by permitting the units to slidably move in relation to each other to widen the lateral space between the units. Connecting each of the harvesting units at their aft ends also enhances operator visibility of the units from the cab region of the harvester.

The non-rotational surface contact between the support structure provided on each slidable harvesting unit and the generally flat support surfaces on the elongated tool bar structure distributes the substantial weight of the harvesting unit across a larger surface area on the tool bar structure than is provided by point surface contact thereby avoiding pitting thereof and other inherent problems associated with rollers and their bearing structure. As such, many of the problems associated with rollers and bearings are reduced without detracting from the convenience of laterally shifting the harvesting units relative to each other. The nonrotational surface contact between the support structure and the tool bar structure further simplifies the present invention making it relatively easy to manufacture and thereby reduce manufacturing costs.

The modular construction of the tool bar structure facilitates quick and ready adjustment to the length of the tool bar structure in a manner corresponding to the particular harvesting unit arrangement being utilized. The pivotal extension at the end of the tool bar structure provides a greater range of lateral adjustment and movement of the individual harvesting units than is typically available with conventional cotton harvesters.

To promote transportation of the harvester and reduce interferences with adjacent rows of cotton plants, the present invention further relates to a method for accessing at least three adjacent harvesting units of a cotton harvester while maintaining a minimal length for the tool bar structure on which the harvesting units are mounted. The method for accessing the harvesting units comprises the steps of: mounting the harvesting units for individualized lateral sliding movements lengthwise along a tool bar assembly between a harvesting position and a service position; moving at least two adjacent harvesting units under the influence of powered driver means as a pair of harvesting units laterally along the tool bar assembly to a service position to provide access between the remaining harvesting unit and an adjacent harvesting unit of said pair of harvesting units; repositioning at least one of said pair of harvesting units in such a manner as to provide access therebetween while maintaining a service position distance between an outermost harvesting unit of said pair of harvesting units similar to that provided for accessing between the remaining harvesting unit and an adjacent harvesting unit of said pair of harvesting units thereby minimizing the length of the tool bar assembly.

The repositioning step in the method for accessing the harvesting units described above involves returning the pair of harvesting units laterally along the tool bar assembly to a harvesting position, and moving the outermost harvesting unit to a service position to provide access between the pair of harvesting units. A further step of the method for accessing the harvesting units may involve: latching two adjacent harvesting units to each other such that upon lateral movement of one of said two adjacent harvesting units, the latched harvesting unit will move in tandem therewith.

Other features and advantages of the present invention will become readily apparent from the following detailed description, appended drawings, and accompanying claims.

BRIEF DESCRIPTION OF THE DRAWINGS

FIG. 7 is a fragmentary elevational view taken along line 7—7 of FIG. 6;

FIG. 8 is a top plan view illustrating one form of tool bar structure which is adaptable to the present invention;

FIG. 9 is a top plan view illustrating another form of tool bar structure with an extension pivotally connected at one end thereof;

FIG. 10 is a top plan view illustrating another form of tool bar structure having a pivotal extension similar to that illustrated in FIG. 9, but arranged in axial alignment with the remaining tool bar structured to which it is attached; and FIG. 11 is a top plan view of another form of tool bar structure with a pivotal extension connected at one end thereof.

DETAILED DESCRIPTION OF THE PRESENT INVENTION

Figure 1:
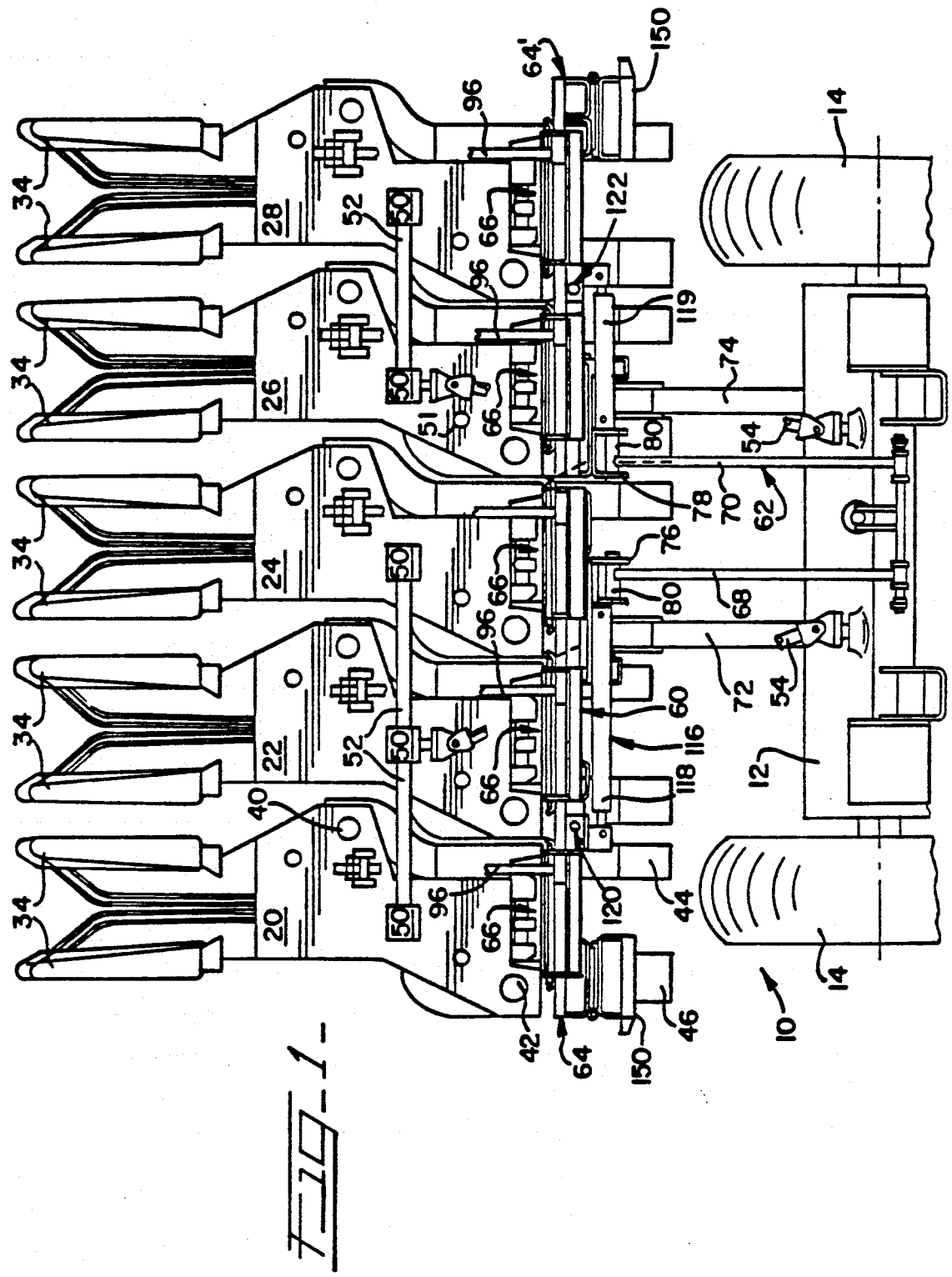
FIG. 1 is a partial top plan view of a cotton harvester illustrating a harvesting unit configuration for harvesting multiple narrow and adjacent row of cotton.

While the present invention is susceptible of embodiments in various forms, there is shown in the drawings a presently preferred embodiment hereinafter described with the understanding that the present disclosure is to be considered as an exemplification of the invention and is not intended to limit the invention to the specific embodiment illustrated.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame 12 mounted on a pair of ground engaging front wheels 14. A pair of steerable rear wheels (not shown) provides the harvester with proper direction.

Positioned forwardly on the frame 12 are a plurality of individual cotton picker harvesting units 20, 22, 24, 26 and 28. As illustrated, the harvesting units are arranged in a side-by-side relationship for harvesting adjacent and generally parallel rows of cotton. It should be appreciated, however, that this invention equally applies to a lesser number of harvesting units than that illustrated.

In a preferred form of the invention, each of the harvesting units is substantially similar in structure. Accordingly, only a description of harvesting unit 20 will be provided with the understanding that the other harvesting units are similarly structured.

Figure 2:
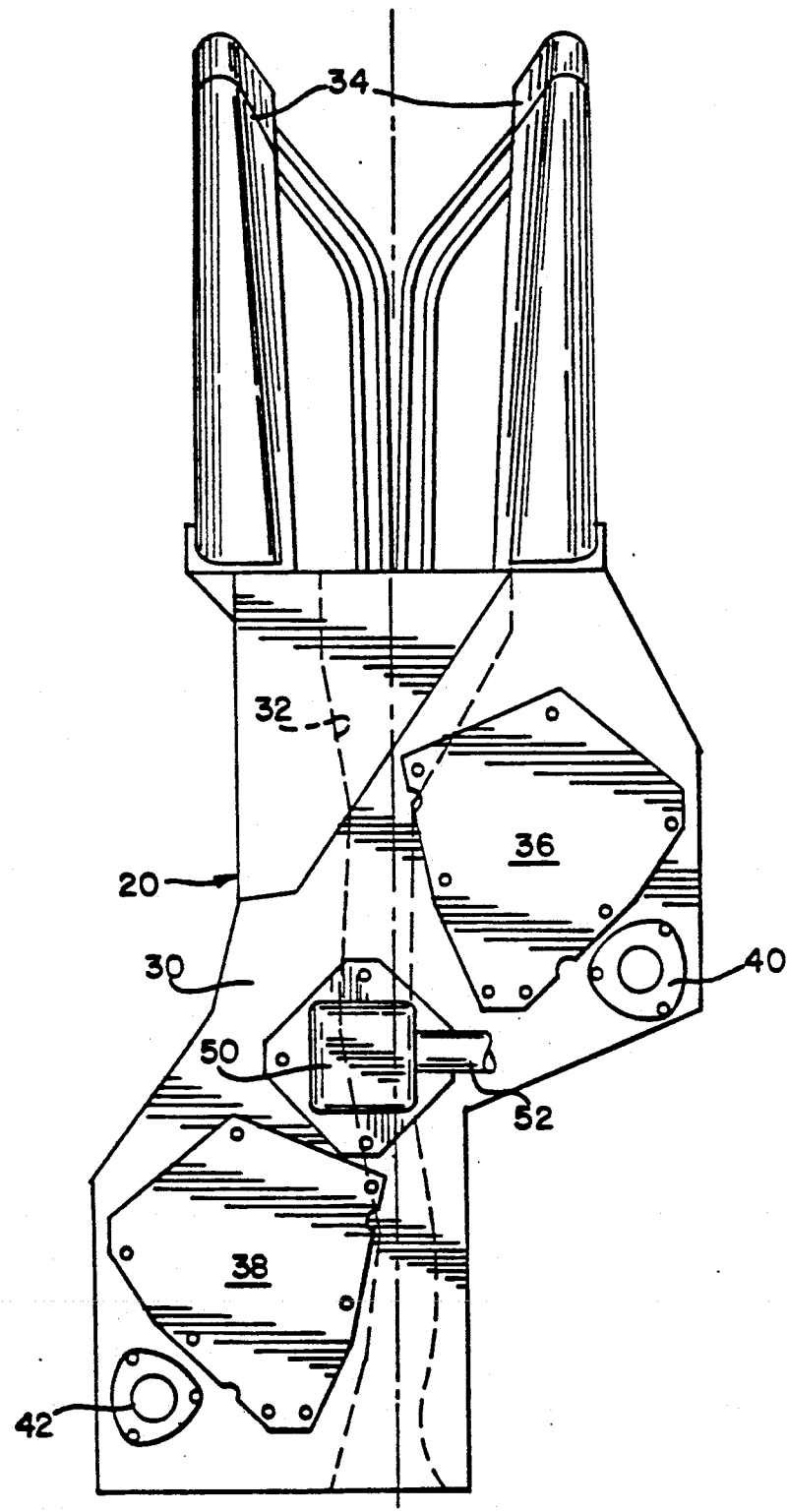
FIG. 2 is a top plan view showing the general configuration of a single harvesting unit.

Turning to FIG. 2, each harvesting unit includes a housing 30 defining a fore-and-aft crop-receiving opening or passage 32. Each harvesting unit is further provided with stalk lifters 34 on either side of opening 32 to guide the row of plants to the opening or passage 32.

As illustrated in FIG. 2, each harvesting unit further includes front and rear spindle rotors 36 and 38 which, in a preferred embodiment, are transversely separated by the fore-and-aft plant passage 32. Adjacent the spindle rotors 36 and 38 are conventional upright doffer assemblies 40 and 42, respectively, which remove cotton from the picking spindles on the spindle rotors 36 and 38. Conventional upright cotton discharge assemblies 44 and 46 (FIG. 1) are provided near the doffer assemblies 40 and 42, respectively. The discharge assemblies receive the cotton removed from the spindle rotors 36 and 38 by the doffer assemblies 40 and 42 and direct same through upright openings in the rear of the units. Cotton conveying ducts (not shown) direct the cotton from the discharge assemblies into a collecting receptacle or chamber (not shown).

As illustrated in FIG. 2, the spindle rotors 36 and 38 and the doffer assemblies 40 and 42 are driven by a conventional drive assembly. As illustrated, such a drive assembly includes a beveled gear transmission mounted in a gear housing 50 preferably arranged at an upper end of each housing 30. Telescopic drive shafts 52 transmit torque and power from input drive shafts 54 to adjacent harvesting units and permit lateral displacement of the harvesting units with respect to each other without loss of power.

A mounting and supporting system, indicated generally by reference numeral 60 in FIG. 1, is provided for individually connecting each of the harvesting units to the frame 12 for vertical movement relative thereto. The mounting and supporting system of the present invention includes a lift assembly 62, an elongated tool bar structure or assembly 64, and individual slide support structures 66 associated with and connecting each harvesting unit to the tool bar structure.

As illustrated in FIG. 1, harvesting units 20 and 28 define an outboard pair of harvesting units. Each harvesting unit 20, 28 is laterally and slidably movable to adjust for various row widths and to open up space between adjacent harvesting units to facilitate servicing thereof. Harvesting units 22 and 26 define an inboard pair of harvesting units. Each harvesting unit 22, 26 is laterally and slidably movable to adjust for various row widths and to open up space between adjacent harvesting units to facilitate servicing thereof. As illustrated, harvesting unit 24 is fixedly secured between harvesting units 22 and 26.

Lift assembly 62 operates as a four-bar parallelogram-type linkage which is pivotally connected to and extends forwardly from the frame 12 for securing the harvesting units to the frame and for permitting vertical displacement of the harvesting units between raised and lowered positions. As illustrated in FIGURE 1, lift assembly 62 includes a pair of laterally spaced upper tension arms 68 and 70 which extends generally parallel to a lower pair of laterally spaced lift arms 72 and 74.

Rearward ends of the tension arms 68, 70 and lift arms 72, 74 are pivotally attached to the frame 12 in vertically spaced alignment to permit angular displacement thereof relative to the frame. Forward ends of tension arms 68, 70 and lift arms 72, 74 are pivotally connected in vertically spaced alignment to a pair of generally U-shaped, upstanding lever arms 76 and 78, respectively. The tension arms 68, 70 have an effective length which is approximately equal to that of the lift arms 72, 74 respectively, and therefore the harvesting units connected thereto are maintained in a generally level attitude during field operation as they are raised and lowered relative to the frame 12.

Figure 3:
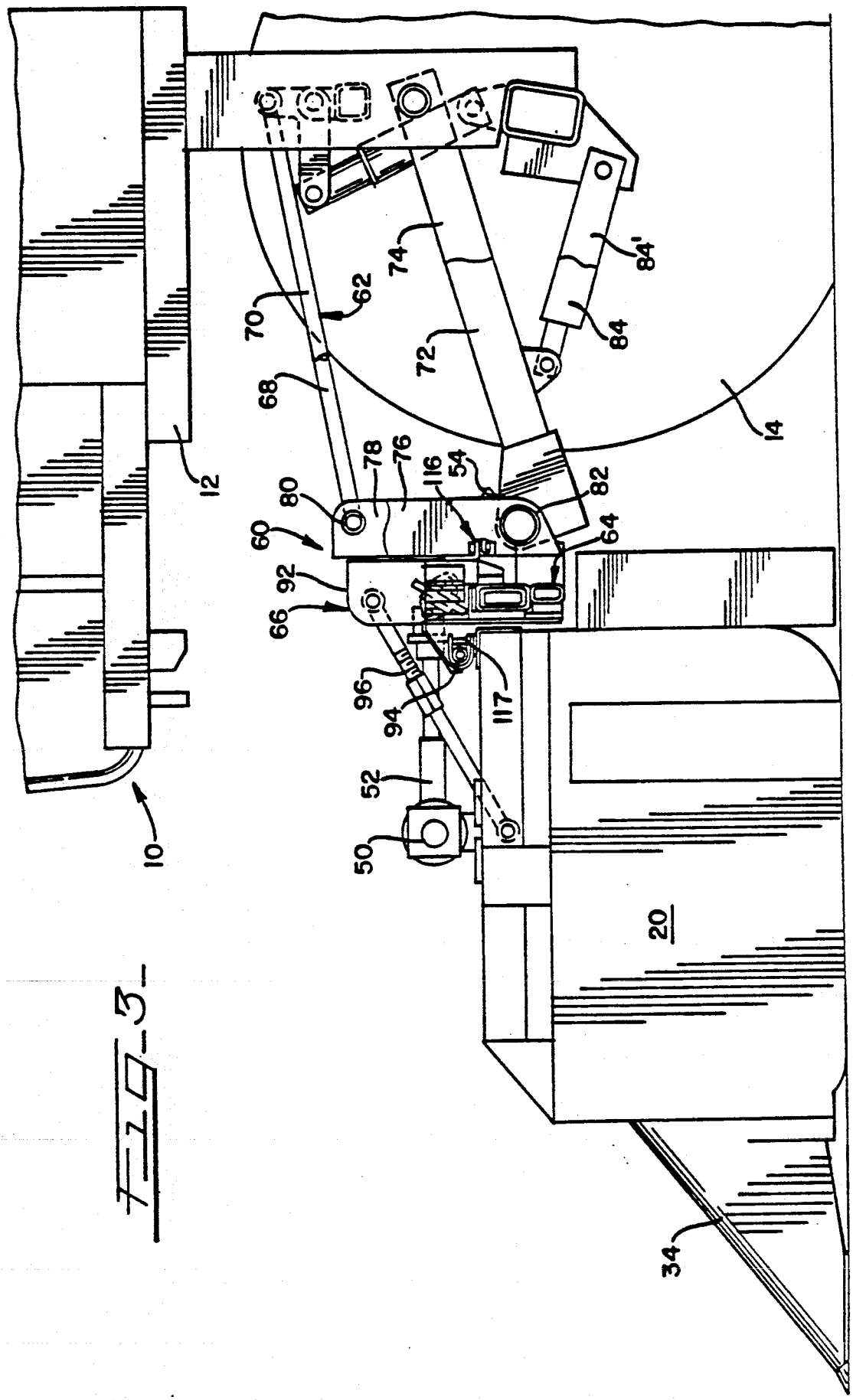
FIG. 3 is a partial side elevational view of the cotton harvester illustrated in FIG. 1.
Figure 4:
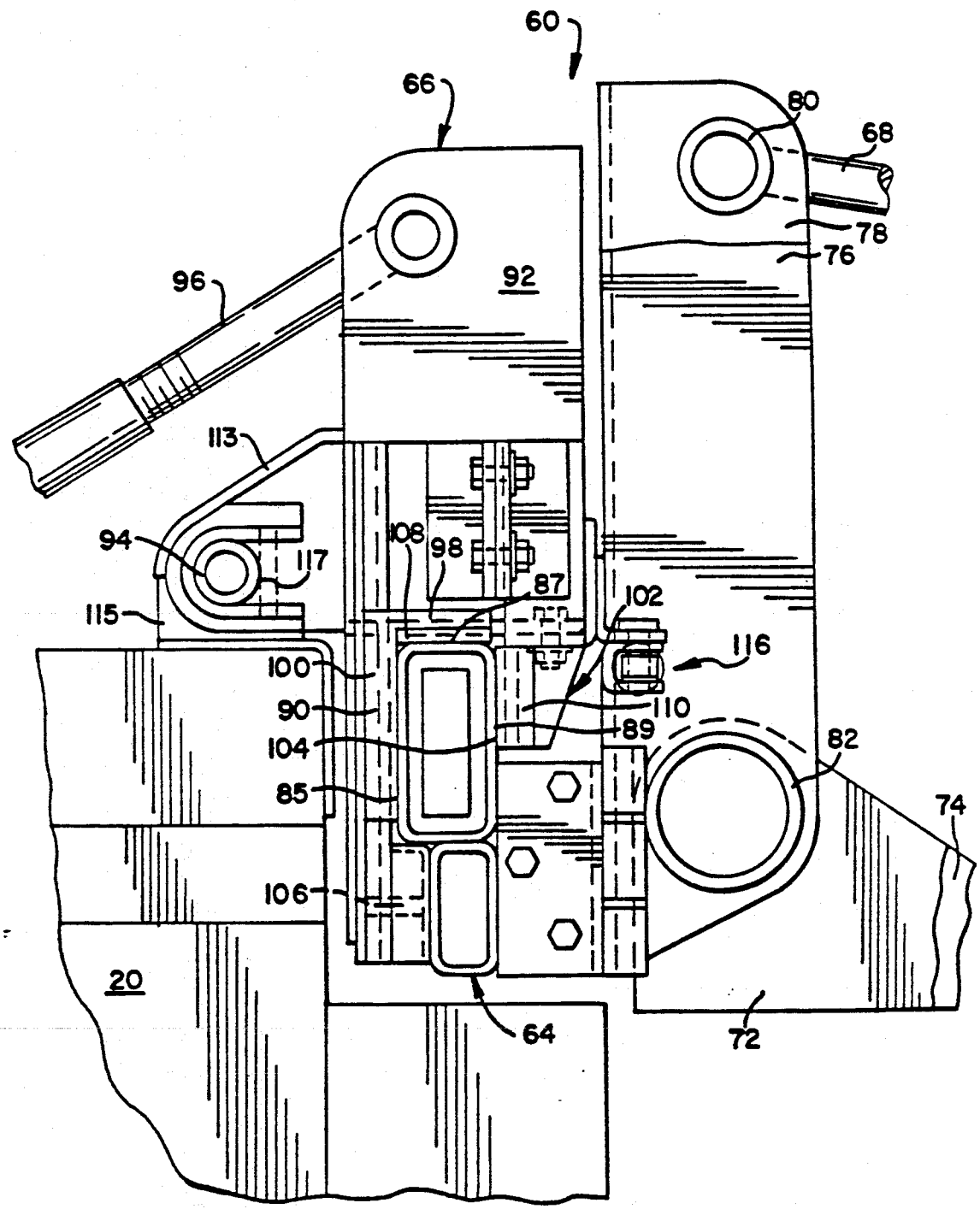
FIG. 4 is an enlarged fragmentary side elevational view of the mounting system as connected to a harvesting unit.

As seen in FIGS. 3 and 4, stub shafts 80 are used to pivotally connect the tension arms 68 and 70 to an upper end of lever arms 76 and 78, respectively. Stub shafts 82 are used to pivotally connect the lift arms 72 and 74 to a lower end of lever arms 76 and 78, respectively. The stub shafts 82 also define a horizontal axis about which the harvesting units 20, 22, 26 and 28 are pivotally connected to the frame 12.

As illustrated in FIG. 3, the lift assembly 62 further includes distendable drivers 84 and 84' for adjusting the angular disposition of the lift arms 72 and 74, respectively, relative to frame 12 and thereby adjusting the vertical position of the harvesting units 20 through 28 relative to the frame. Preferably, drivers 84, 84' are in the form of double-acting hydraulic cylinders. The cylinder end of each driver is pivotally connected to the frame 12. The rod end of driver 84 is pivotally connected to the lift arm 72, while the rod end of driver 84' is pivotally connected to the lift arm 74. As will be appreciated, the operative length of the hydraulic cylinder will control the angular disposition of the lift assembly and thereby the harvesting units connected to the tool bar.

The elongated tool bar structure 64 is comprised of one or more laterally elongated structural members which laterally extend from the lift arms 72, 74. Preferably, and as seen in FIG. 4, structure 64 is formed from rectangularly shaped tubes which are welded or otherwise secured together one on top of another and which extend across the forward end of the frame 12. As seen in FIG. 1, the elongated tool bar structure 64 is fixedly secured as by welding it intermediate its ends to the lever arms 76 and 78 of the lift assembly 62.

Figure 5:
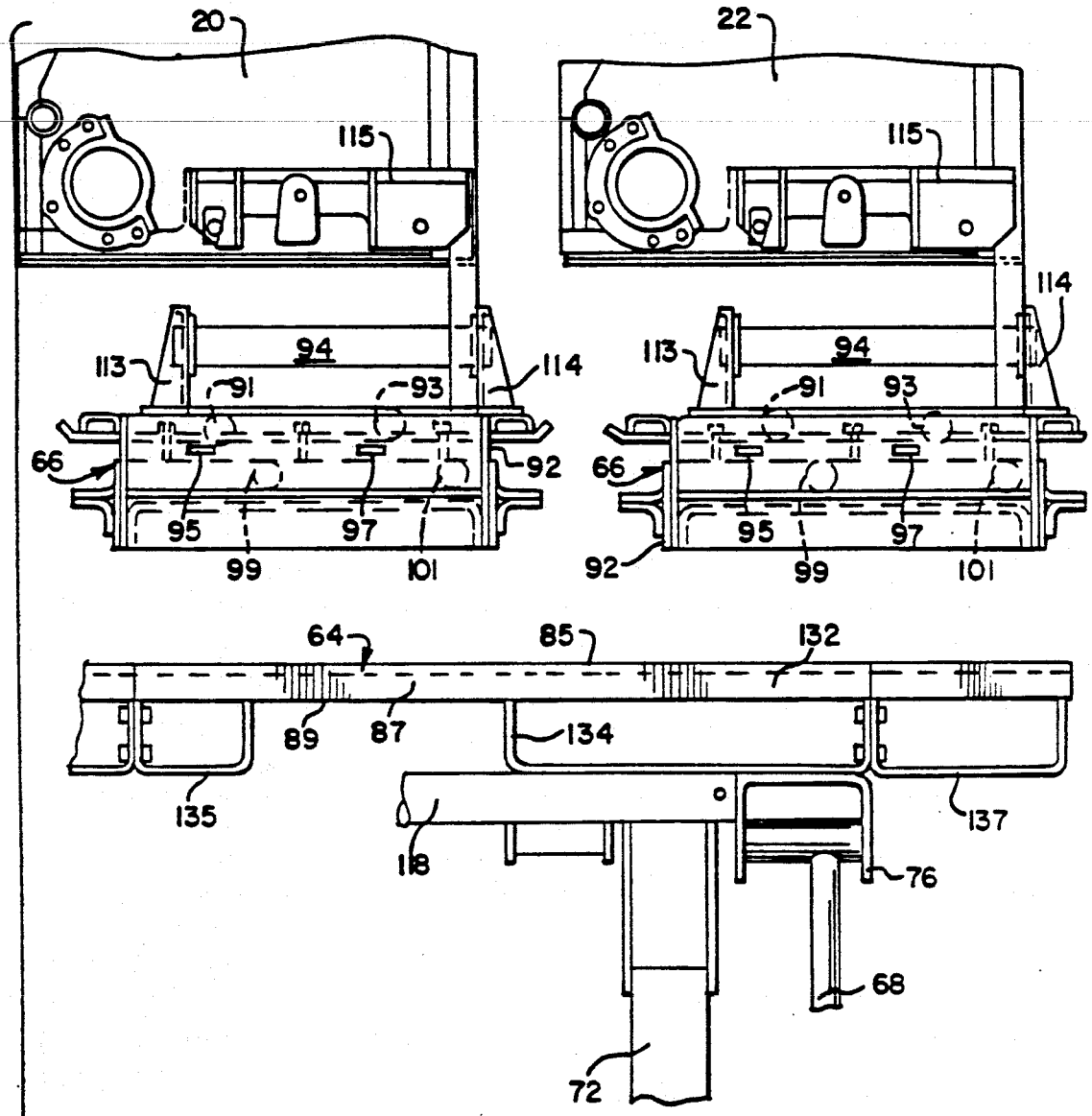
FIG. 5 is a top plan view illustrating individual elements of the mounting system illustrated in FIG. 4 in disassembled relation to each other.

Turning to FIGS. 4 and 5, the tool bar structure 64 is configured to define generally flat support surfaces 85, 87 and 89. Each support surface laterally extends between the ends of the tool bar structure with support surfaces 85 and 89 being spaced in a fore-and-aft relation relative to each other.

To facilitate connecting the harvesting units to the tool bar structure 64 in a manner allowing independent slidable lateral movements between the ends thereof while concurrently inhibiting pivotal movement of the harvesting unit about the elongated length of the tool bar structure, each harvesting unit has a slide support structure 66 advantageously provided at a rear portion thereof. The rearward location of the slide support structure 66 permits each harvesting unit to hang off of and forwardly from the tool bar structure 64 in a manner providing increased access between the units and unobstructed operator visibility to the forward end of the harvesting unit from a cab region on the cotton harvester.

Each slide support structure 66 is substantially identical in construction and, therefore, the following description will equally apply to each support structure. Preferably, and as seen in FIG. 4, each slide support structure 66 includes a generally horizontal, channel-shaped bracket 90, an upstanding generally U-shaped lever arm 92, a horizontally disposed support pin 94, and tension link 96.

Preferably, bracket 90 and lever arm 92 are integrally formed from a weldment or casting. As illustrated in FIG. 4, bracket 90 is adapted to straddle and slide along the support surfaces of tool bar structure 64. In the illustrated embodiment, bracket 90 includes a laterally extending, generally horizontal leg section 98 which is preferably joined to a laterally extending, generally vertical leg section 100. The length of each leg section 98, 100 is substantially equal to the width of lever arm 92. Moreover, the leg sections 98, 100 of bracket 90 extend generally parallel to and confront support surfaces 85, 87 of the elongated tool bar structure 64.

Bracket 90 further includes a laterally extending adjustable support member 102. In the preferred embodiment, support member 102 is substantially equal to the width of and is suitably connected to lever arm 92. Support member 102 defines a guide face 104 which extends generally parallel to and confronts support surface 89 in a manner entrapping, as seen in FIG. 4, the elongated tool bar structure 64 between leg sections 98, 100 and guide face 104. The straddling or embracing relationship between the leg sections 98, 100 and guide face 104 of each support structure 66 and the support surfaces 85, 87 and 89 of the tool bar structure permits the substantial weight of the harvesting unit connected thereto to be spread over a substantial surface area to promote lateral sliding movement of the harvesting units along the tool bar structure while inhibiting rotational movement thereof about the longitudinal axis of the tool bar 64.

To facilitate movement of the harvesting units relative to the tool bar structure, relatively low friction and durable surfaces are preferably provided between confronting surfaces on each slide support structure 66 and the support surfaces 85, 87 and 89 of the tool bar structure. In one form, such low friction durable surfaces may be provided by dipping, spraying or otherwise applying a powder coating on the support surfaces 85, 87, 89 of the tool bar structure 64. Such powder coating may be of the type sold by Atochem Co. of Glen Rock, New Jersey under the name Rilsan—Nylon II.

Alternatively, a series of inserts 106, 108 and 110 may be interposed between confronting surfaces of each slide support structure 66 and the support surfaces 85, 87 and 89, respectively, on the tool bar 64 for facilitating lateral movement of the harvesting unit along the length of the tool bar structure. Such inserts are preferably formed from a relatively low friction material such as a 1900 ultra-high molecular weight polyethylene material sold by Himont Co. of Wilmington, Delaware Such inserts could also be fabricated from brass or other suitable metals.

As illustrated, the inserts 106, 108 are interposed and suitably secured to and between the leg sections 98, 100 and support surfaces 85, 87, respectively, of tool bar structure 64. Insert 110 is suitably secured to and between guide face 104 of support member 102 and support surface 89 of the tool bar structure 64.

To further promote lateral sliding movement of the harvesting units along the tool bar structure, and as illustrated in FIG. 5, each support structure may further include three pairs of rollers. The first pair of rollers includes laterally spaced rollers 91 and 93. Rollers 91 and 93 are provided on each support structure 66 to act against support surface 85 of the tool bar structure. The second pair of rollers comprises laterally spaced rollers 95 and 97. Rollers 95 and 97 are provided on each support structure 66 to act against support surface 87 of the tool bar structure. The third pair of rollers includes laterally spaced rollers 99 and 101. Rollers 99 and 101 are provided on each support structure 66 to act against support surface 89 of the tool bar structure. Each of the above-mentioned rollers preferably has a wide surface design to spread the load carried thereby over a broad surface area.

To facilitate connecting each harvesting unit to the tool bar structure 64, lever arm 92 of each support structure has a laterally extending support pin 94 arranged forwardly thereof and intermediate its upper and lower ends. The support pin 94 is entrapped between the free ends of a pair of arms 113 and 114 forwardly extending from and connected to lever arm 92.

Fixedly attached to a rearward end of each harvesting unit is a saddle bracket 115. Each harvesting unit is independently attached or connected to the tool bar structure 64 by sliding the saddle bracket 115 over the drum support pin 94. After pin 94 is located in the saddle bracket 115, a suitable pin or bolt 117 (FIGS. 3 and 4), provided rearwardly of the pin 94, passes through the saddle bracket 115 to entrap the pin 94 within the saddle bracket 115. As will be appreciated, the harvesting unit so connected is rotatable about the pin 94.

The tension link 96 is provided to inhibit an associated harvesting unit from inadvertently rotating downward about pin 94. To facilitate movement of the harvesting units between raised and lowered positions, a forward end of each tension link is pivotally secured or attached to a forward end of the harvesting unit. The opposite end of link 96 is pivotally connected to an upper end of lever arm 92. Link 96 is suitably designed to permit its operative length to be readily adjusted in a manner orientating the angular disposition of the harvesting unit relative to the ground surface. As the harvesting unit tries to rotate downward about the pin 94, the link 96 goes into tension pulling on lever arm 92. As will be understood, this pull on lever arm 92 is transferred into the bracket 90 and is applied as torque to the elongated tool bar structure 64. The rigidity of the elongated tool bar structure 64 counteracts this torque and holds the harvesting units upright.

A selectively operated drive mechanism 116 is provided to facilitate precise and positive lateral positioning of each movable harvesting unit along the length of the tool bar structure 64. In a preferred form, and as illustrated in FIG. 1, drive mechanism 116 includes a pair of linearly distendable drivers or actuators 118, 119 which extend in opposite directions relative to each other generally parallel to the tool bar structure 64. Preferably, each driver 118, 119 is a double-acting hydraulic cylinder. The cylinder end of each driver is pivotally connected to the tool bar structure 64. The rod end of each driver extends toward and is connected to the outermost harvesting unit at opposite ends of the tool bar structure 64.

Drive mechanism 116 permits movement of the outermost harvesting units 20 and 28 either independently of or conjointly with movement of the inner and adjacent harvesting units 22 and 26, respectively. To effect such ends, drive mechanism 116 further includes connecting mechanisms 120 and 122 (FIG. 1). Connecting mechanism 120 operates in combination with harvesting units 20 and 22, while connecting mechanism 122 operates in combination with harvesting units 26 and 28. Since the connecting mechanisms 120 and 122 are of substantially similar construction, only connecting mechanism 120 will be discussed in detail, with the understanding that connecting mechanism 122 is substantially similar.

Figure 6:
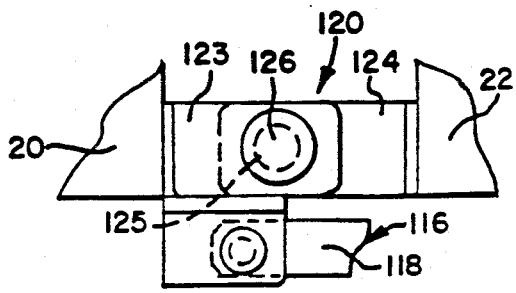
FIG. 6 is a fragmentary top plan view of a mechanism used to releasably connect two adjacent harvesting units.

Turning to FIGS. 6 and 7, each connecting mechanism includes connectors 123, 124. Connector 123 is fixedly mounted on the outermost harvesting unit 20 and connector 124 is fixedly mounted on an adjacent inner harvesting unit 22. A slidable pin 125 passes through and releasably joins the connectors 123, 124 to each other. In a preferred form, the pin 125 is connected to and operated by a solenoid or other suitable actuator 126 capable of linearly moving pin 125 relative to the connectors 123, 124.

As will be understood, movement of the outer harvesting unit 20 under the influence of driver 118 is effected either independently of or conjointly with an adjacent harvesting unit 22, depending upon whether connectors 123, 124 are locked to each other by pin 125. The above-described connection arrangement is exemplary of one type of mechanism that could be used to releasably join adjacent harvesting units to each other, but it should be appreciated that a myriad of other releasable connection arrangements with or without pins would suffice to effect the same ends without detracting from the spirit and scope of the present invention.

As illustrated in FIGS. 8 through 11, the tool bar structure 64 is of modular construction allowing it to assume many different forms. As illustrated in FIG. 8, a one-piece elongated tubular support 132 may suffice if only one of two harvesting units are adapted for sliding movement therealong. Support 132 defines the elongated support surfaces 85, 87 and 89 along which the slide support structure 66 slidably moves. As illustrated, support 132 has lever arm 76 welded or otherwise secured at one end thereof. Bracket 134 and 135 are suitably secured to opposite ends of support 132.

As illustrated in FIG. 9, and to laterally extend the length of tool bar structure 64 to facilitate increased travel of the harvesting units therealong without requiring removal of the harvesting units therefrom, two relatively short modular extensions 136 and 138 are suitably attached to opposite ends of the tubular support 132. The extensions 136, 138 are axially aligned with the support 132 and serve to coextensively extend the support surfaces 85, 87 and 89 of the tool bar structure along which the slide structures slidably move. Each extension 136, 138 includes a bracket 137 which abuts with and is suitably connected to a like bracket 134, 135 on support 132.

Turning now to FIG. 10, there is illustrated a tool bar structure 64 capable of supporting two or more harvesting units for lateral sliding movement relative to each other. In the embodiment illustrated in FIG. 10, tubular support 132 has relatively long and relatively short modular extensions 140, 142, respectively, suitably connected in axially aligned order relative to each other. As will be appreciated, the extensions 140, 142 are suitably connected to each other to coextensively extend the support surfaces 85, 87 and 89 defined by the tool bar structure 64.

Another alternative form of tool bar structure 64 is illustrated in FIG. 11. As illustrated, various length modular extensions 144, 146 and 148 are suitably connected to tubular support 132. The extensions 144, 146 and 148 are axially aligned with support 132 and serve to coextensively extend the lateral length of the support surfaces 85, 87 and 89 of the tool bar structure 64.

In each of the embodiments illustrated in FIGS. 9 through 11, a pivotal extension 150 may be connected at one or both ends of the tool bar structure 64 as with a vertical hinge 152. The pivotal extension 150 is configured to selectively elongate each of the support surfaces 85, 87, 89 provided on the tool bar structure 64 as by pivotally moving the extension 150 into axially aligned and coextensive relation with the tool bar structure as through an arcuate path. When pivoted into an axially aligned position as illustrated in FIG. 10, the pivotal extension 150 provides added length to the support surfaces 85, 87, 89 to facilitate lateral movement of the harvesting unit during serviceability or to allow a harvesting unit to be laterally positioned thereon to facilitate harvesting a row of cotton normally spaced outside the width of the tool bar structure.

Although a single tool bar structure 64 whose length is readily adjustable as by adding modular extensions thereto will serve to support the harvesting units at the forward end of the cotton harvester, it may be desirable that a second tool bar structure 64' (FIG. 1) be used in conjunction therewith. It will be understood that the second tool bar structure 64' is substantially similar to tool bar structure 64 and, thus no detailed description need be provided therefore.

In those harvesting arrangements including three or more harvesting units, two or more harvesting units may be slidably accommodated on one tool bar structure, while the remaining harvesting units including stationary and/or movable units are mounted on the other tool bar structure. The ability to easily add to the length of the tool bar structure will facilitate an increase in harvesting row capacity.

As illustrated in FIG. 1, in those arrangements wherein one or more movable harvesting units are carried by independent tool bar structures, it is advantageous to allow for independent vertical movement of each tool bar structures 64 and 64'. To effect such ends, each tool bar structure has its own lift assembly connected thereto. Tension arm 68, lift arm 72, and lever arm 76 define a first lift assembly having a driver 84 (FIG. 3) associated therewith for adjusting the vertical disposition of tool bar structure 64 and the harvesting units connected thereto. Similarly, tension arm 70, lift arm 74, and lever arm 78 define a second lift assembly having driver 84' (FIG. 3) associated therewith for adjusting the vertical disposition of tool bar 64' and the harvesting units connected thereto. As will be appreciated, independent control of the drivers 84, 84' associated with the first and second lift assemblies will independently govern the vertical positions of the tool bar structures 64, 64' connected thereto and, thereby, the vertical disposition of the harvesting units connected thereto.

When the cotton harvester is being transported, harvesting units 20 through 28 are preferably carried in a raised position. By distending drivers 84, 84', the lift arms 72, 74 are caused to pivot the tool bar structures 64, 64' into raised or transport positions. Because the harvesting units 20 through 28 are individually connected to the tool bar structures 64, 64', they too are vertically raised into a transport position.

In preparation for harvesting, drivers 84, 84' are operated to allow the lift arms 72, 74 to pivot downward. Downward movement of the lift arms 72, 74 results in the tool bar structures 64, 64' and thereby the harvesting units carried thereon being lowered. The ultimate vertical position of the harvesting units is controlled by adjusting the operative or effective lengths of the drivers 84, 84'. After obtaining the proper vertical disposition of the tool bar structures 64, 64' and the harvesting units, the lateral spacing between the individual harvesting units is set.

To provide access to the units for inspection and servicing, one or more of the harvesting units may be laterally slid along the elongated tool bar structure to effect a wider spacing therebetween. If necessary, pivotal extension 150 may be pivoted into axially aligned relation with the elongated tool bar structure (FIG. 8) to provide the support surfaces with the necessary contiguous width for effecting lateral spacing of the harvesting units relative to each other.

A salient feature of the present invention being the non-rotating contact between each slide support structure 66 and the tool bar structure 64 along which it slidably moves. As will be appreciated, the relationship between the support surfaces 85, 87 and 89 on each tool bar and each slide support structure 66 inhibits rotational movement of the harvesting unit about the longitudinal axis of the tool bar structure. Moreover, non-rotating contact between the slide support structure 66 and the support surfaces 85, 87 and 89 on the tool bar structure 64 promotes distribution of the substantially heavy load of the harvesting unit over a broad area, thus avoiding pitting of the support surfaces of the tool bar structure and thereby facilitating sliding movement of the harvesting units therealong.

The relative low friction and durable surfaces provided between each slide support 66 and the tool bar structure 64 reduces the frictional sliding contact between the slide support 66 and the flat support surfaces 85, 87 and 89. Accordingly, the movable harvesting units can be laterally moved relative to each other to facilitate inspection or wider row spacings therebetween.

The provision of rollers 91, 93, 95, 97, 99 and 101 on each slide support structure will further enhance slidability of the harvesting units along the length of the tool bar structure. Because of their broad surface contact with the support surfaces of the tool bar structure, the loads carried thereby are spread over a broad surface area to inhibit pitting of the tool bar structure.

To further facilitate precise lateral sliding movement of one or more of the harvesting units along the tool bar structure 64, the operator-controlled driver mechanism 116 may be operated. If lateral sliding movement of at least one harvesting unit per side is desired, the connecting mechanisms 120 and 122 of the operator-controlled drive mechanism 116 are appropriately operated to disconnect the outermost harvesting units from an adjacent inner harvesting unit. Alternatively, if more than one harvesting unit per side is to be moved, the appropriate connecting mechanism is operated to connect the outer harvesting unit to the inner harvesting unit. Accordingly, when the driver mechanism 116 is operated, the outer and inner harvesting units are positively and precisely moved along the length of the tool bar structure.

Each driver associated with the driver mechanism 116 is operable to positively position the harvesting units connected thereto in any of an infinite number of positions along the length of the tool bar structure.

Moreover, when the driver mechanism 116 is not being used to laterally move the harvesting units along the length of the tool bar, each driver associated with the drive mechanism operates to positively position and hold the associated harvesting units in the position selected by the operator.

It should be appreciated that the method of laterally moving the harvesting units between first and second positions can be effected through any source of linear actuation. A rack and pinion assembly could alternatively be applied to the support structure to provide such movement. Actuation of such a rack and pinion arrangement could be effected with a manual hand crank fitted to the respective pinion to achieve the desired movement for the harvesting units. The drive arrangement described in detail above is preferred in that it provides convenient control that could be operated from the cab of the cotton harvester or from a location remote from the cab.

To promote transportation of the harvester and reduce interferences with adjacent rows of cotton plants, the present invention further relates to a method for accessing at least three adjacent harvesting units of a cotton harvester while maintaining a minimal length for the tool bar structure on which the harvesting units are mounted. The method for accessing the harvesting units comprises the steps of: mounting the harvesting units for individualized lateral sliding movements lengthwise along a tool bar assembly between a harvesting position and a service position; moving at least two adjacent harvesting units under the influence of powered driver means as a pair of harvesting units laterally along the tool bar assembly to a service position to provide access between the remaining harvesting unit and an adjacent harvesting unit of said pair of harvesting units; repositioning at least one of said pair of harvesting units in such a manner as to provide access therebetween while maintaining a service position distance between an outermost harvesting unit of said pair of harvesting units similar to that provided for accessing between the remaining harvesting unit and an adjacent harvesting unit of said pair of harvesting units thereby minimizing the length of the tool bar assembly.

The repositioning step in the method for accessing the harvesting units described above involves: returning the pair of harvesting units laterally along the tool bar assembly to a harvesting position, and moving the outermost harvesting unit to a service position to provide access between the pair of harvesting units. A further step of the method for accessing the harvesting units may involve: latching two adjacent harvesting units to each other such that upon lateral movement of one of said two adjacent harvesting units, the latched harvesting unit will move in tandem therewith.

The ability to add modular extensions to the tool bar structure 64 in a manner coextensively extending the lateral support surfaces 85, 87 and 89 provides for numerous combinations of row spacings and harvesting capacities. The modular design of the tool bar structure further facilitates convenient transportation of the tool bar structure from the supplier to the farmer. Moreover, the configuration of the tool bar structure 64 in combination with support structure 66 allows the harvesting units to be hung forwardly from the tool bar structure such that the support structure is located adjacent the aft end of the harvesting unit which is substantially to the rear of the center of gravity of the harvesting unit. By such construction, the space between the units is opened to allow the operator free access therebetween for servicing and inspection and furthermore enhances visibility from the cab region and styling. Moreover, the ability to laterally slide the harvesting units along the coextensive support surfaces provides a single cotton harvester with the ability to harvest both narrow row and more conventional widely spaced row cotton with a minimum amount of conversion time.

Because the forward end of the cotton harvester is normally disposed in a close relationship to the ground surface over which the harvester is moved, dirt and debris are often drawn into each harvesting unit. To reduce the amount of dirt and debris drawn into the harvesting unit during operation, the operative length of tension link 96 may be adjusted in a manner properly and independently positioning the harvesting unit relative to the ground surface over which the harvester will move.

From the foregoing, it will be observed that numerous modifications and variations can be effected without departing from the true spirit and scope of the novel concept of the present invention. It will be appreciated that the present disclosure is intended to set forth exemplifications of the invention which are not intended to limit the invention to the specific embodiments illustrated. The disclosure is intended to cover by the appended claims all such modifications as fall within the scope of the claims.

What is claimed is:

1. A method of accessing at least three adjacent harvesting units of a cotton harvester while maintaining a minimal length for a tool bar assembly on which the harvesting units are mounted, said method comprising the steps of:

mounting said harvesting units for individualized lateral sliding movements lengthwise along the tool bar assembly between a harvesting position and a service position;

moving at least two adjacent harvesting units as a pair of harvesting units under the influence of powered driver means laterally along the tool bar assembly to a service position to provide access between a remaining harvesting unit and an adjacent harvesting unit of said pair of harvesting units; and repositioning at least one harvesting unit of said pair of harvesting units in such a manner as to provide access between the harvesting units comprising said pair of harvesting units while maintaining a service position distance between an outermost harvesting unit of said pair of harvesting units similar to that provided for accessing between the remaining harvesting unit and an adjacent pair of said harvesting units.

2. The method according to claim 1 wherein said repositioning step comprises the step of returning said pair of harvesting units laterally along the tool bar assembly to a harvesting position, and moving the outermost harvesting unit of said pair of harvesting units to a service position to provide access between said pair of harvesting units.

3. A method of accessing at least three adjacent harvesting units of a cotton harvester while maintaining a minimal length for a tool bar assembly on which the harvesting units are mounted comprising the steps of:

mounting each harvesting unit for individualized lateral sliding movements lengthwise along the tool bar assembly between a harvesting position and a service position;

latching two adjacent harvesting units to each other to define a pair of harvesting units;

moving said pair of harvesting units in a latched condition laterally along the tool bar assembly to a service position thereby providing service access between said remaining harvesting unit and an adjacent harvesting unit of said pair of harvesting units;

returning said pair of harvesting units in a latched condition to said harvesting position;

unlatching said harvesting units of said pair of harvesting units from each other; and moving an outermost harvesting unit of said pair of harvesting units laterally along the tool bar assembly to a service position thereby providing access therebetween while minimizing the length of the tool bar assembly.

4. A method of accessing first, second, third, fourth, and fifth adjacent harvesting units of a cotton harvester comprising the steps of:

mounting said third harvesting unit on a tool bar assembly in a laterally stationary position;

mounting said first and second harvesting units for individualized lateral sliding movements on one side of said third harvesting unit and lengthwise along a tool bar assembly between a harvesting position and a service position;

mounting said fourth and fifth harvesting units for individualized lateral sliding movements on an opposite side of said third harvesting unit and lengthwise along a tool bar assembly between a harvesting position and a service position;

moving said first and second harvesting units as a first pair and in tandem with movement of said fourth and fifth harvesting units as a second pair away from said third harvesting unit to provide access between said second, third, and fourth harvesting units; and repositioning at least one harvesting unit of said first and second pairs in tandem and in such a manner as to provide access between said first and second harvesting units and said fourth and fifth harvesting units while maintaining a service position distance between said first, third, and fifth harvesting units similar to that provided for accessing between said second, third, and fourth harvesting units thereby minimizing the length of the tool bar assembly.

* * * * *